United States Patent [19]

Midorikawa et al.

[11] Patent Number: 5,832,462
[45] Date of Patent: Nov. 3, 1998

[54] ELECTRONIC DEALING SYSTEM FOR PERFORMING AUTOMATIC MATCHING BETWEEN ORDER SIDE AND HIT SIDE CUSTOMERS

[75] Inventors: Hideyo Midorikawa; Hitoshi Matsubara, both of Kawasaki; Takashi Shimatani; Yasuhide Yamamoto, both of Tokyo, all of Japan

[73] Assignees: Fujitsu Limited, Kawasaki; Kokusai Denshin Denwa Co Ltd.; Minex Corporation, both of Tokyo, all of Japan

[21] Appl. No.: 203,252
[22] Filed: Mar. 1, 1994

[30] Foreign Application Priority Data

Mar. 1, 1993 [JP] Japan .................................. 5-040075

[51] Int. Cl.⁶ ............................................. G06F 157/00
[52] U.S. Cl. ............................................... 705/35
[58] Field of Search .................................. 364/401, 406, 364/408; 340/825; 235/379; 705/35, 30

[56] References Cited

U.S. PATENT DOCUMENTS

| | | | |
|---|---|---|---|
| 4,799,156 | 1/1989 | Shavit et al. | 364/401 |
| 4,903,201 | 2/1990 | Wagner | 364/408 |
| 4,910,676 | 3/1990 | Alldredge | 364/408 |
| 4,980,826 | 12/1990 | Wagner | 364/408 |
| 5,077,665 | 12/1991 | Silverman et al. | 364/408 |
| 5,126,936 | 6/1992 | Champion et al. | 364/408 |
| 5,136,501 | 8/1992 | Silverman et al. | 364/408 |
| 5,375,055 | 12/1994 | Togher et al. | 364/408 |

FOREIGN PATENT DOCUMENTS 2-291070  11/1990  Japan .

*Primary Examiner*—Gail O. Hayes
*Attorney, Agent, or Firm*—Staas & Halsey

[57] ABSTRACT

A electronic dealing system (EDS), implemented on a general purpose computer used in processing transactions, establishes, manages and updates values of credit lines not only between individual customers but also between groups of customers or between one customer and one group of other customers. Plural customers can be assembled as a subject, or home, group for whom a common credit line is set relative to other customers or customer groups; further, an individual customer or individual group of customers can assemble other, plural customers as an object, or opposing, group and for whom a common credit line is set. A subject or home group may set a common credit line value relative to an individual object, or opposing, customer or group of customers and, in transaction matching processing in relation to a customer of the home group, a credit line check is performed using the common credit line value of the home group in establishing a transaction with an opposing customer or customer group and the established amount of the transaction is subtracted from the common credit line value of the home group.

11 Claims, 19 Drawing Sheets

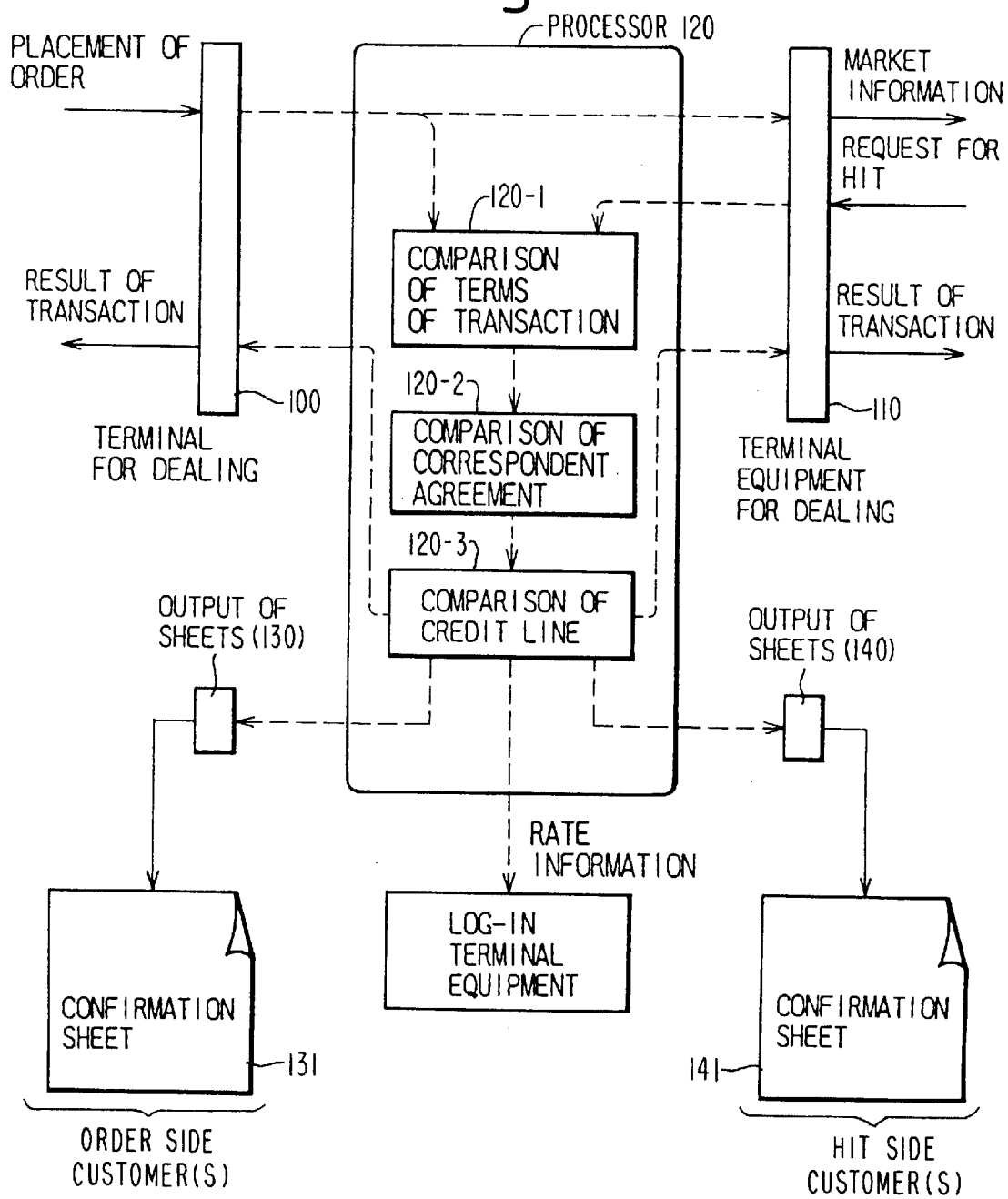

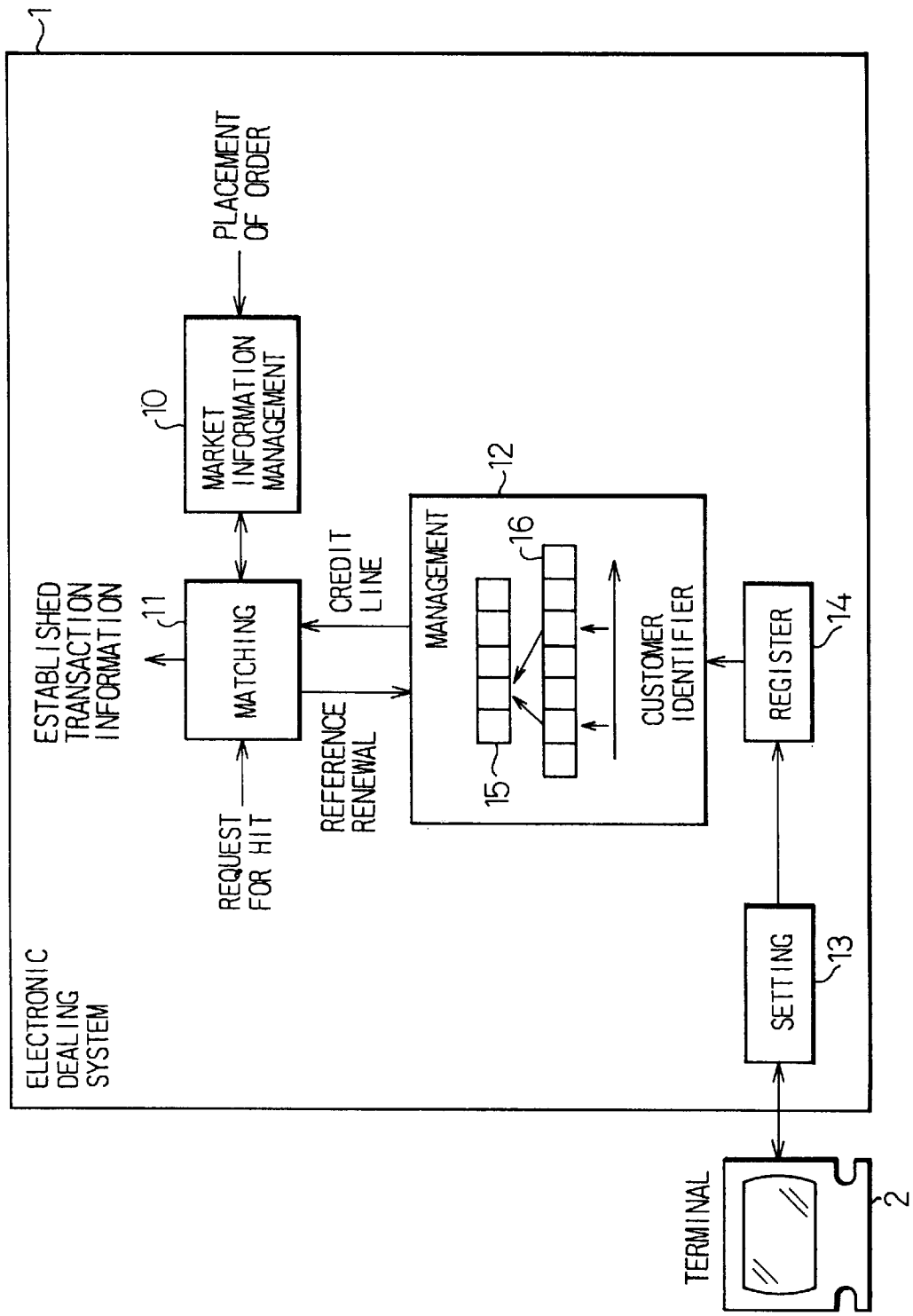

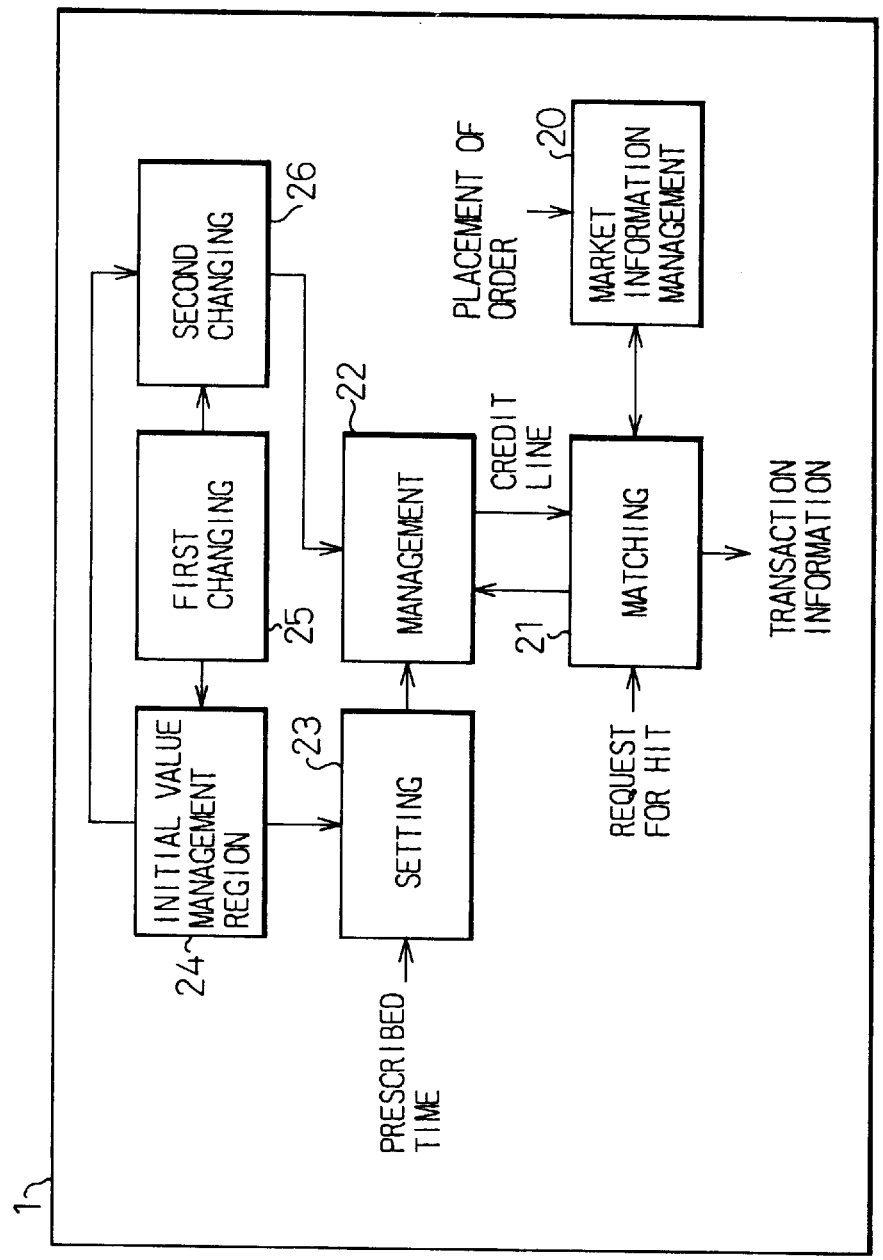

Fig. 5

| SELLING | | | BUYING | | |
|---|---|---|---|---|---|
| 144.55 | 30 | 1 | 140.70 | 20 | 1 |
| 144.60 | 70 | 3 | 140.55 | 80 | 4 |
| 144.65 | 20 | 2 | 140.50 | 30 | 1 |
| 144.70 | 10 | 1 | 140.40 | 10 | 1 |
| 144.75 | 20 | 1 | 140.20 | 10 | 1 |

↑ PRICE  ↑ AMOUNT  ↑ PARTY

Fig.8

| CREDIT LINE(CL) STORING ADDRESS | ← KEY |
| --- | --- |
| DAY AND TIME FOR RENEWAL | |
| DAY TO BE PROCESSED | |
| INITIAL VALUE | |
| PRESENT VALUE | |
| NUMBER OF TOTAL VALUE DATE | |
| NUMBER OF VALUE DATE FOR EACH RECORD | |
| (1) VALUE DATE / INTEGRATED VALUE | |
| (2) | ← CUMULATIVE VALUE TABLE |
| (3) | |
| (4) | |
| (5) VALUE DATE / CUMUTATIVE VALUE | |

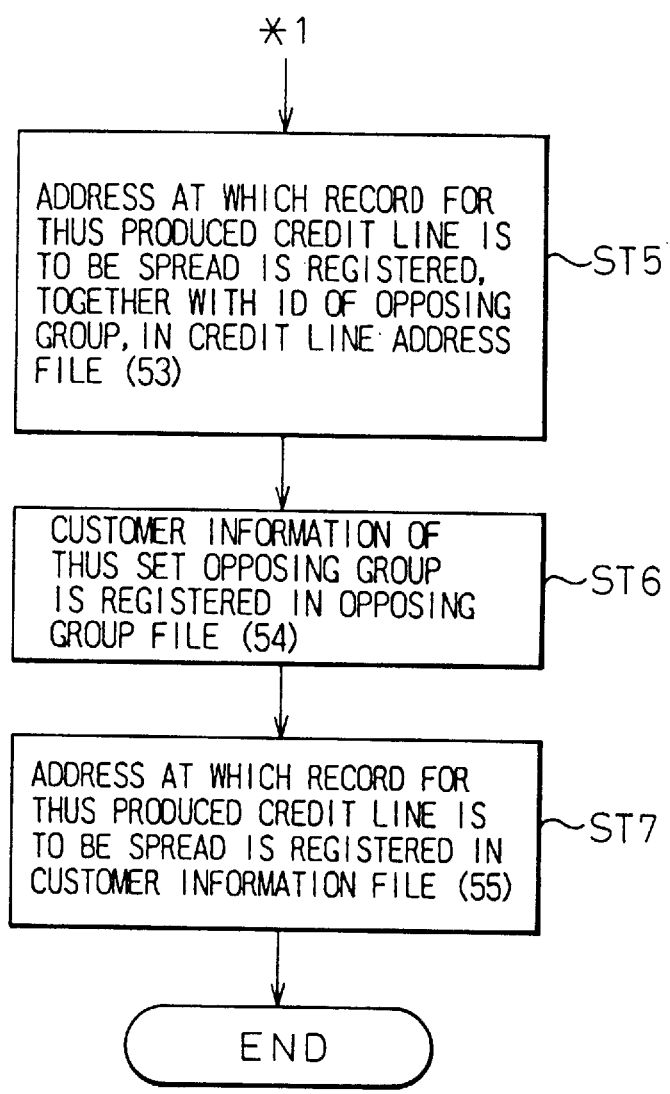

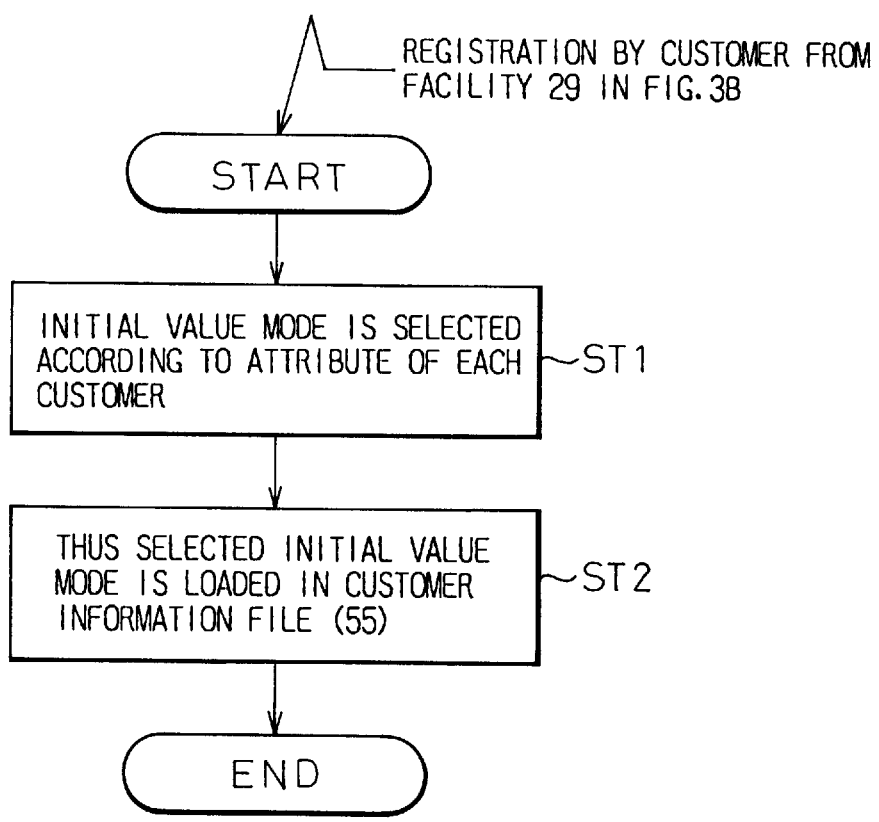

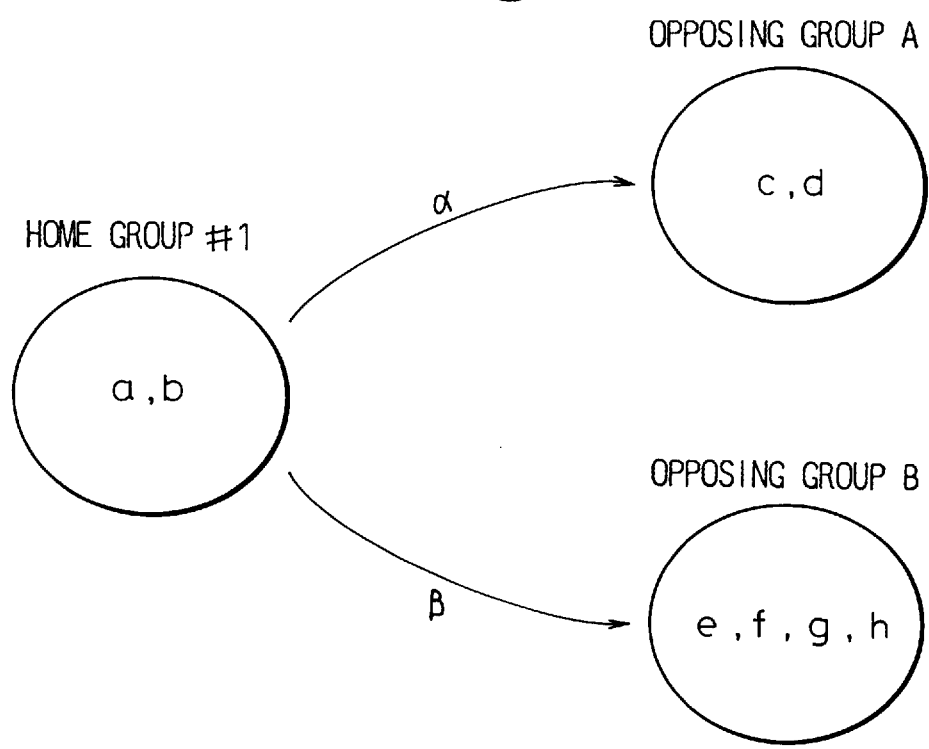

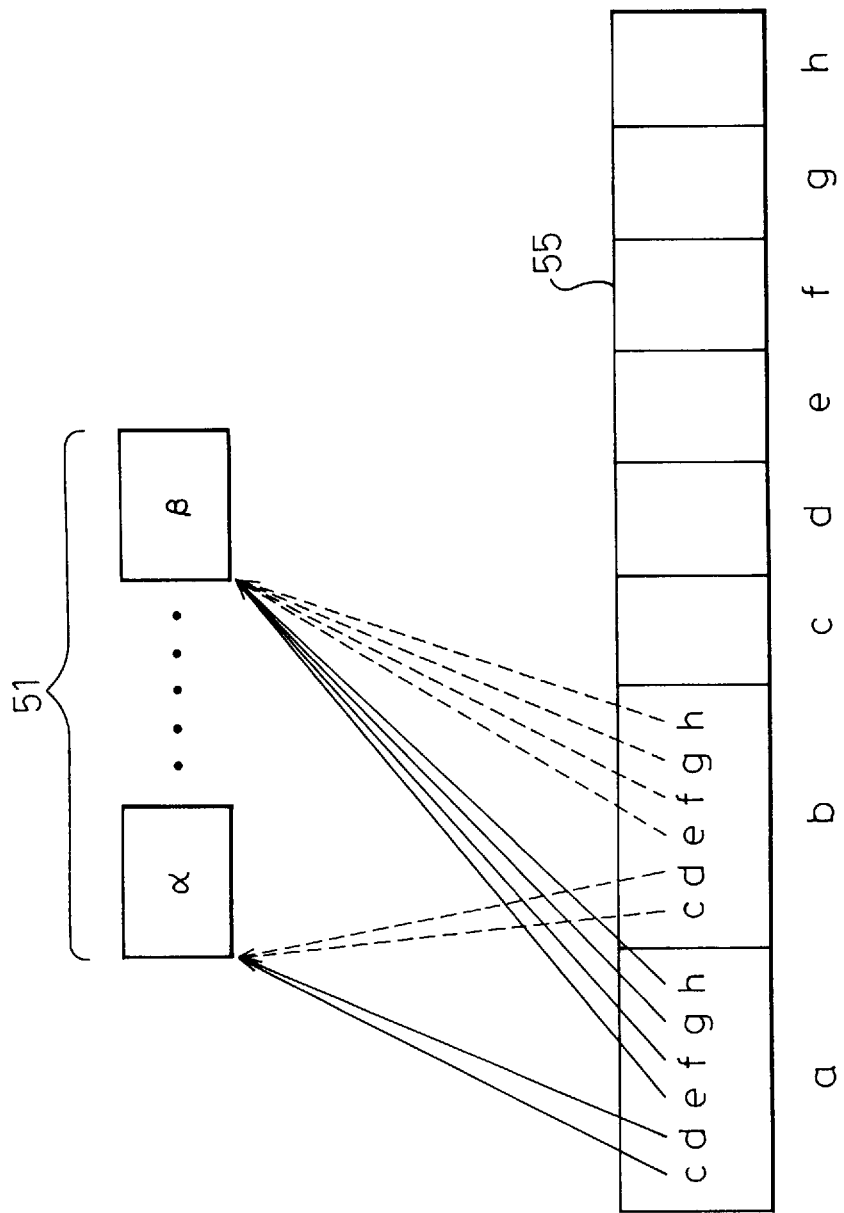

ELECTRONIC DEALING SYSTEM FOR PERFORMING AUTOMATIC MATCHING BETWEEN ORDER SIDE AND HIT SIDE CUSTOMERS

BACKGROUND OF THE INVENTION

1. Field of the Invention

The present invention relates to an electronic dealing system which electronically performs matching processing of information on transaction orders placed by order side customers and information on transaction orders placed by hit side customers so as to establish transactions; more particularly, the invention relates to an electronic dealing system which enables transactions to be established in accordance with market needs.

In electronic dealing systems which handle foreign exchange etc., matching processing is performed electronically between information on transaction orders placed by the order side customers and information on transaction orders placed by the hit side customers so as to establish transactions. To make such an electronic dealing system practical, it is necessary to construct it so as to enable transactions meeting with (i.e., which satisfy) market needs.

2. Description of the Related Art

As explained in detail later, in a conventional electronic dealing system, there was the problem that transactions adaptable to market needs were not realized.

SUMMARY OF THE INVENTION

The present invention was made in consideration of the above circumstances and has as its object the provision of a new electronic dealing system which enables transactions meeting market needs to be realized.

To attain the above object, the present invention is constituted by being provided with a setting means which groups a plurality of customers into a home group, sets a common credit line for the customers as a whole in the home group, as an initial value of a credit line set between the home group and a single other customer not belonging to the home group, or which groups a plurality of customers into an opposing group and sets a common credit line for the customers, as the initial value of a credit line set between a customer setting the line and the customers of the opposing group.

BRIEF DESCRIPTION OF THE DRAWINGS

The above object and features of the present invention will be more apparent from the following description of the preferred embodiments with reference to the accompanying drawings, wherein:

FIG. 1 is a view of the overall constitution of an electronic dealing system to which the present invention is applied, FIG. 2 is a view of the basic constitution of the present invention, FIG. 3A is a view showing a first example of a system construction of the present invention, FIG. 5 is a view showing an example of the display of rate information, FIG. 8 is an embodiment of a recording structure of a credit line file, FIGS. 9A and 9B show an embodiment of the flow of processing executed by an initial value setting process, FIG. 10 shows an embodiment of the flow of processing executed by an initial value mode selection process, FIG. 13 shows an example of the processing of the initial value setting process, FIG. 15 shows an example of the processing of the initial value setting process.

DESCRIPTION OF THE PREFERRED EMBODIMENTS

The present invention enables realization of transactions meeting the needs of the market.

Figure 3B:
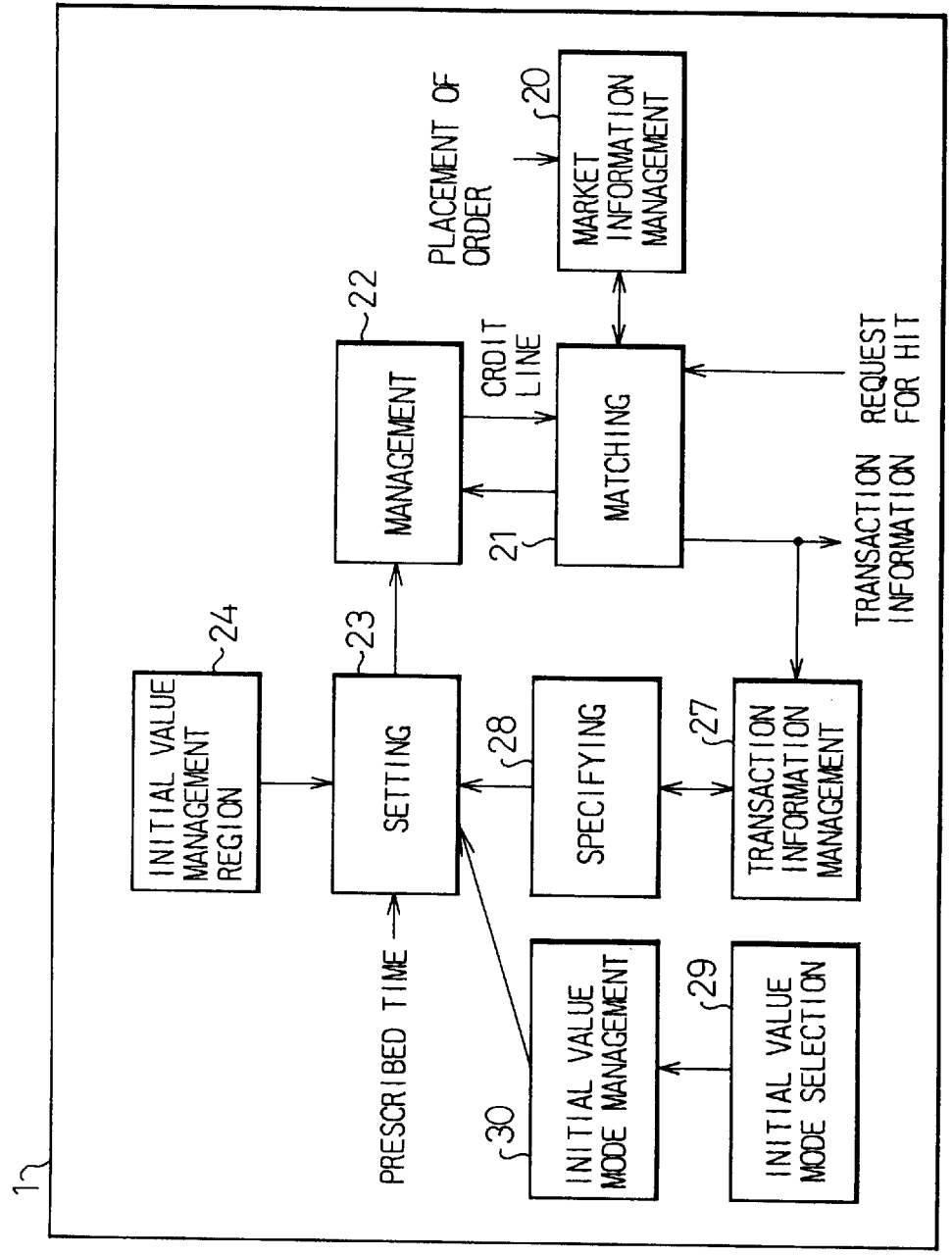
FIG. 3B is a view showing a second example of a system construction of the present invention.

FIG. 2 is a view of the basic constitution of the present invention. Further, FIG. 3A is a view showing a first example of a system construction of the present invention, and FIG. 3B is a view showing a second example of a system construction of the present invention.

In FIG. 2, block represents 1 block represents is an electronic dealing system to which the present invention applies. It is designed to perform matching processing between the information on transaction orders placed by order side customers and information on transaction orders placed by hit side customers, so as to establish transactions between the two parties. Reference numeral 2 is a terminal provided in association in the electronic dealing system 1.

The electronic dealing system 1 of the present invention shown in FIG. 2 is provided with a market information management means unit 10 for managing orders placed by order side customers, a matching means unit 11 for executing matching processing for investigating if there is a match between an order placed by an order side customer and a request for hit placed by a hit side customer under limiting conditions designated limited by their credit lines, a management means unit 12 for managing the present values of credit lines, which are reduced each time a transaction is established, starting from the initial values of the credit lines, a setting means unit 13 for setting the initial values of the credit lines through interaction with a terminal 2, for example, and a registration means unit 14 for registering the initial values of the credit lines set by the setting means unit 13 in the management means unit 12.

The management means 12 may be provided with a credit line management region 15 for managing the initial values and subsequent, present (i.e., current) values of credit lines set between one customer and another and an address management region 16 for managing addresses of the credit line management region 15 corresponding to the customers for whom credit lines have been set, using customer identifiers as retrieval keys. By this arrangement, the initial values and the subsequent, present (i.e., current) values of the credit lines are sometimes managed corresponding to the customers for whom credit lines have been set, using the customer identifiers as retrieval keys.

The electronic dealing system 1 shown in FIGS. 3A and 3B is provided with a market information management unit 20 for managing the orders placed by order side customers, a matching unit 21 for executing matching processing for investigating if there is a match between an order placed by an order side customer and a request for a hit placed by a hit side customer under limiting conditions consistent with their credit lines, a management unit 22 for managing the present (i.e., current) values of the credit lines, which are reduced each time a transaction is approved, starting from the initial values of the credit lines, a setting unit 23 for setting the initial values of the credit lines in the management unit 22 each time a prescribed time arrives, and an initial value management region 24 for managing the initial values of the credit lines.

In addition to this construction, the electronic dealing system 1 shown in FIG. 3A may be provided, for example, with a first changing unit 25 for changing the initial values of the credit lines managed by the initial value management region 24 through interaction with a terminal 2 (FIG. 2), for example, and a second changing unit 26 for changing the present values of the credit lines managed by the management unit 22.

On the other hand, in addition to this construction, the electronic dealing system 1 shown in FIG. 3B may be provided with a transaction information management unit 27 for managing transaction information, a specifying unit 28 for specifying the amount of transactions which must be settled on the date on which the initial values of the credit lines are set, in accordance with the transaction information managed by the transaction information management unit 27, an initial value mode selection unit 29 for selecting a designation mode of the initial values of the credit lines through interaction with the terminal 2 (FIG. 2), for example (for example, a first mode for rewriting the initial value each time a prescribed time arrives and a second mode for subtracting the unsettled amount of the transactions from the initial value), and an initial value mode management unit 30 for managing the designated mode information selected by the initial value mode selection unit 29.

The mode of operation will be explained below. In the electronic dealing system 1 of the present invention, whose basic constitution is illustrated in FIG. 2, the setting unit 13 groups a plurality of customers in a home group through interaction with the terminal 2, for example, and sets a common credit line for the customers as a whole in the home group as an initial value of the credit line, i.e., a credit line for the home group, set between this group and another single customer not belonging to this home group. After the setting processing, the registration unit 14 registers as the initial value of the credit line a common credit line which the setting unit 13 has set at an entry position in the management unit 12 designated by the identifiers of the customers in the same group set by the setting unit 13.

In accordance with this registration processing, the management unit 12 manages the same credit line for the customers in the same home group. By this, for example, it is possible for a plurality of customers, such as a branch a, a branch b, and a branch c under a bank A to be given a common credit line with another single customer, for example, a bank B.

When adopting this management construction, the management means 12 preferably performs processing so as to maintain, as is, the credit line set between the home group and a single other customer even when some of the members (customers) comprising the home group are eliminated or new ones are added.

Further, the setting unit 13 sets a certain single customer as the customer setting the line through interaction with the terminal 2, for example, and groups other customers, not belonging to that customer setting the line, as an opposing group. Further, it sets a credit line of the customer setting the line as an initial value of a credit line set with the customers of this opposing group as the common credit line for these customers. After this setting processing, the registration unit 14 registers, as the initial value of the credit line, a common credit line which the setting unit 13 has set at an entry position in the management unit 12 designated by the identifiers of the customers in the same home group set by the setting unit 13 so that the line becomes common for the customers, for whom a credit line has been set, belonging to the opposing group.

In accordance with this registration processing, the management unit 12 manages the same credit line for the customers in the same home group and manages the same credit line for the customers for which a credit line has been set in the opposing group. By this arrangement, for example, it is possible for a first plurality of customers, such as a branch a, a branch b and a branch c of a bank A, to have a common credit line with a second plurality of customers, such as a branch d, a branch e and a branch f under a bank B.

When adopting this management construction, the management unit 12 preferably performs processing so as to maintain, as is the credit line set between the home group and the opposing group even when some of the members (customers), comprising either the home group or the opposing group, are eliminated or new ones are added.

Further, the setting unit 13 groups one plurality of customers in a home group through interaction with the terminal 2, for example, and groups another plurality of customers not belonging to the home group in an opposing group. Further, it sets a credit line to be held by the home groups, that is, a common credit line as an initial value of a credit line set with the customers belonging to the opposing group. After this setting processing, the registration unit 14 registers, at an entry position of the management unit 12 designated by the customer identifier in the home group set by the setting means 13 and as the initial value of the credit line, a common credit line set by the setting unit 13 which becomes common for the customers, for which a credit line has been set, belonging to the opposing group.

In accordance with this registration processing, the management means 12 manages the same credit line for the customers, for which a credit line has been set belonging to the same opposing group. By this arrangement, for example, it is possible for a plurality of customers such as a branch a, a branch b and a branch c under a bank A, to be given a common credit line with another single customer, for example, a bank B.

When adopting this management construction, the management unit 12 preferably performs processing so as to maintain, as is, the credit line set between the home group and the opposing group even when some of the members (customers) comprising the opposing group are eliminated or new ones are added.

In this way, in the electronic dealing system 1 of the present invention, whose basic constitution is shown in FIG. 2, a credit line, which is a condition for establishment of a transaction, may be suitably set in accordance with the attributes (nature) of the customers, so whereby it becomes possible to establish transactions meeting market needs.

In the electronic dealing system 1 of the present invention, shown as a first example of the system construction in FIG. 3A, when the first changing unit 25 changes the initial value of a credit line managed by the initial value management region 24, the second changing unit 26 finds the amount of difference between the initial value before the change and the initial value after the change and increases or decreases the present value of the credit line managed by the management unit 22 by exactly that difference, so as to thereby change the present value of the credit line.

In this way, in an electronic dealing system 1 of the present invention shown in FIG. 3A, when the initial value of the credit line is changed, the present value of the credit line is simultaneously changed, by exactly the amount of difference due to the change. By this arrangement, it is possible to change and set the credit line demanded by the market from the point of time of the change without waiting for a prescribed time, for setting the initial value of the credit line, to arrive. Therefore, it becomes possible to realize a transaction meeting market needs.

Further, in the electronic dealing system 1 of the present invention shown as a second example of the system construction in FIG. 3B, when the setting unit 23 refers to the managed data of the initial value mode management unit 30 and determines that the initial value mode selection unit 29 has selected the first designation mode as the designation mode of the initial value of the credit line, it sets the initial value, managed in the initial value management region 24, as the initial value of the credit line in the management unit 22 when a prescribed time for setting the initial value of the credit line arrives. If it determines that the second designated mode has been selected, it sets into the management unit 22 the sum of the credit line value, determined based on the amount of transactions to be settled and specified by the specifying unit 28, and the present value of the credit line, managed by the management unit 22 in place of the initial value managed by the initial value management region 24.

That is, the setting unit 23 renews the present value of the credit line with a preprepared initial value at each prescribed time for setting the initial value of the credit line when the first designation mode has been selected. On the other hand, the setting unit 23 renews the present value of the credit line with the amount of transactions to be settled on that day and the present value of the credit line at each prescribed time for setting the initial value of the credit line.

In this way, in the electronic dealing system of the present invention shown in FIG. 3B, it is possible to use, as the initial value, the sum of the credit line determined based on the amount of transactions to be settled that day and the present value of the credit line in accordance with the nature of the customers when setting the initial value of the credit line. When selecting the use of this sum, it becomes possible to prevent the amount of unsettled transactions from increasing. Therefore, it become possible to realize transactions meeting market needs while giving consideration to the nature of the individual customers.

Below, the present invention will be explained in detail in accordance with embodiments of application to an electronic dealing system handling foreign exchange.

Figure 4:
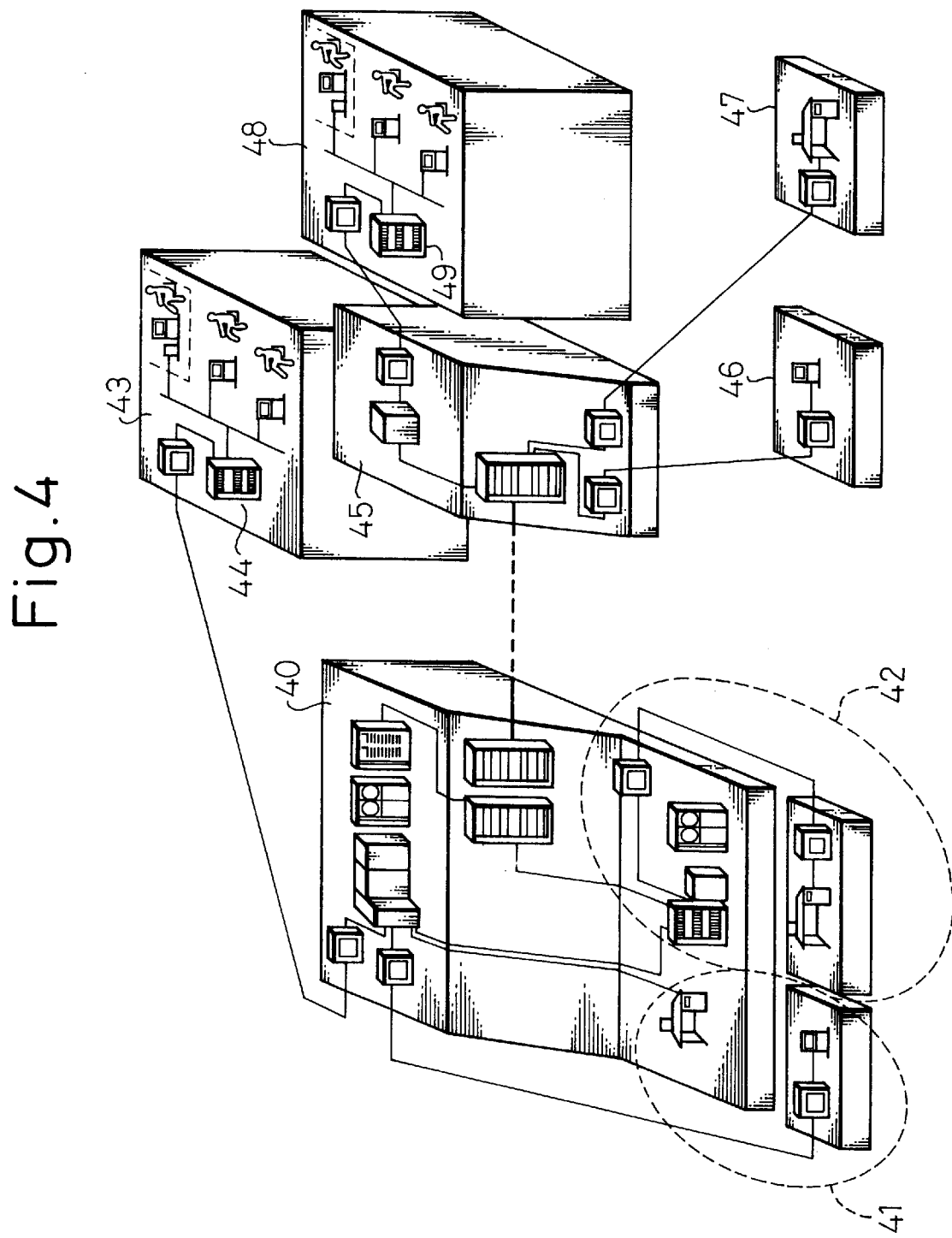
FIG. 4 is a view of the actual system construction of an electronic dealing system which embodies the present invention.

FIG. 4 is a view of the actual system construction of an electronic dealing system handling foreign exchange and which embodies the present invention.

In FIG. 4, a host system 40 manages the information on requests for transactions of foreign exchange issued from customers and performs matching processing on this request information thereby to establish transactions for dealing in foreign exchange. Reference numeral 41 is a monitoring system connected to the host system which monitors the operation of the host system 40. Reference numeral 42 is a charging system connected to the host system 40 which processes service fees etc. for the established transactions. Reference numeral 43 is a customer system connected to the host system 40 which executes processing for interaction with customers. Reference numeral 44 is a subscriber control apparatus which is provided in the customer system 43 and supports terminals under the customer system 43.

Reference numeral 45 is a subsystem provided overseas, for example, which supports the host system 40. Reference numeral 46 is a monitoring system connected to the subsystem 45 and which monitors the state of operation of the host system etc. Reference numeral 47 is a charging system connected to the subsystem 45 and which processes the service fees, etc. for established transactions. Reference numeral 48 is a customer system, connected to the subsystem 45, which executes processing for interaction with customers. Reference numeral 49 is a subscriber control apparatus provided in the customer system 48 and which supports the terminals in the customer system 48.

The host system 40 is designed to manage the orders of information on transaction orders placed by order side customers for promoting the establishment of transactions of foreign exchange and displays, on the display screens of the terminals in the customer systems (43, 48), the information on transaction requests.

FIG. 5 is a view showing an example of the display of rate information presented on the display of the customers. This rate information has a five-line structure comprised of five records. Here, the "price" in the figure shows the exchange rate of "US$1=140.20 yen", the "amount" shows the amount of the transaction (1 amount =US$1 million), and the "party" shows the number of customers offering that price. To facilitate transactions, the offers are arranged in the order of the best rate down.

Figure 6:
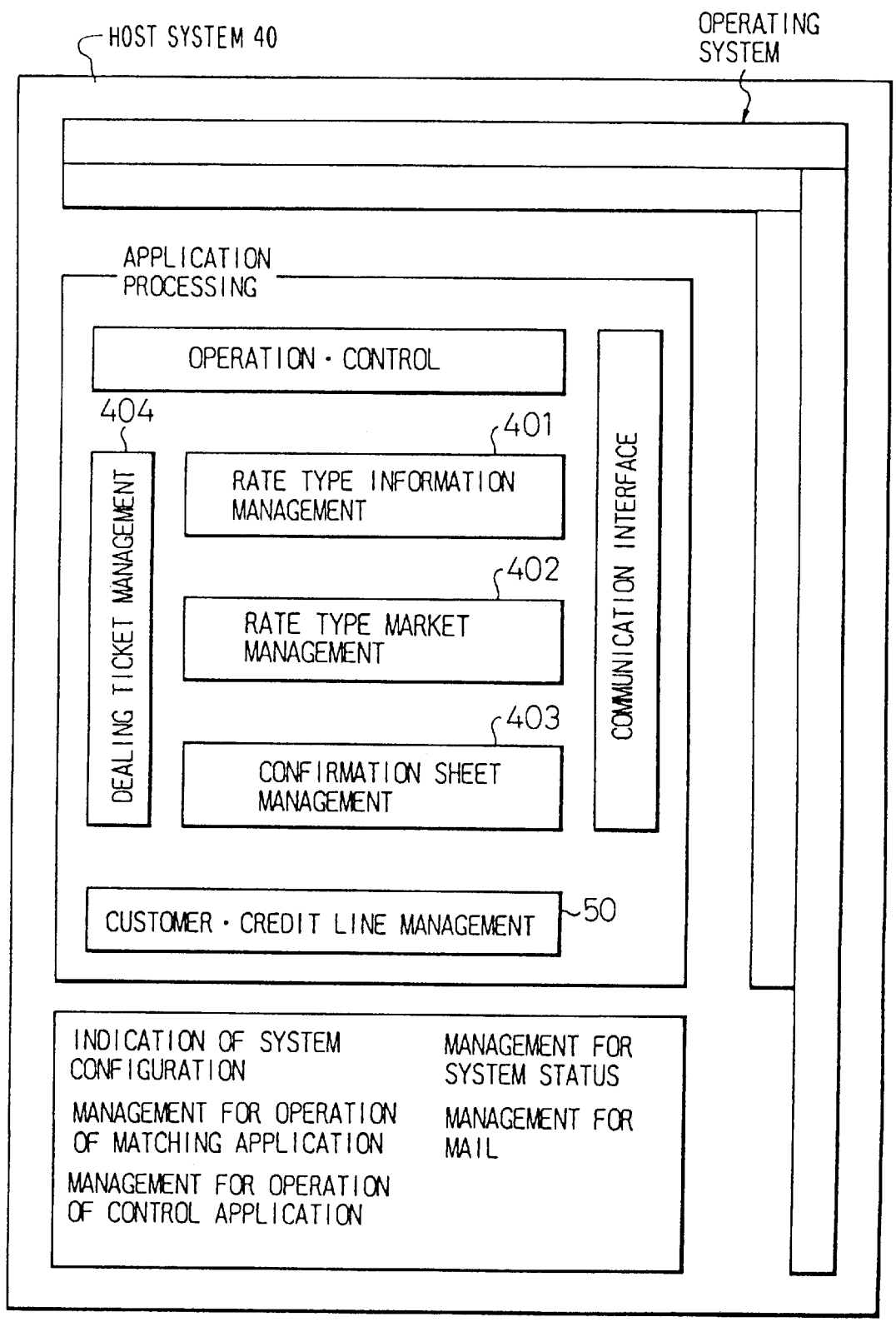
FIG. 6 is a view of the functional structure of software of a host system.

FIG. 6 is a view of the functional structure of software of a host system 40.

The rate type information management facility 401 in the figure performs processing to collect and manage orders placed by the order side customers and to display them on the terminals in the customer systems 43, 48. The rate type market management facility 402 performs processing so as to promote establishment of transactions by executing matching processing between the placed orders and the hit requests. The confirmation sheet management facility 403 performs processing so as to prepare confirmation sheets of the information of the established transactions and mail them to the ordering customers and the hit request customers. The customer credit line management facility 50 manages various kinds of customer information required for the matching processing and manages the credit line information required for the matching processing. The dealing ticket management facility 404 issues to the charging system 42 a request for processing of the service fees for the established transaction.

Here, a brief explanation will be made of the limiting conditions on transactions imposed by the credit lines. For example, if an order side customer offers an amount of 10 as the amount of the transaction and a hit side customer requests an amount of 8 as the amount of the transaction, a transaction is established in the amount of 8. At this time, if either the present credit line which the order side customer sets for the hit side customer or the present credit line which the hit side customer sets for the order side customer is less than the amount of 8, the transaction ends up being established at the amount of transaction determined by the smaller credit line. This is the limiting condition of the customers' transactions is determined by their credit lines. Also, if a transaction is established, the credit lines are reduced by the amount of that transaction.

The present invention, as explained with reference to FIG. 2, is constructed so as to group the customers in a home group and an opposing group and is constructed to set common credit lines between them. Further, as explained with reference to FIG. 3A, when changing the initial values of the credit lines, it is possible to change the present values of the credit lines in accordance with that or, as explained with reference to FIG. 3B, when changing a present value of a credit line to an initial value, it is possible to use, as the initial value, the sum of the present value of the credit line and a credit line determined by the sum of transactions to be settled on that day. This processing is realized by the customer credit line management facility 50 among the facilities shown in FIG. 6.

Figure 7:
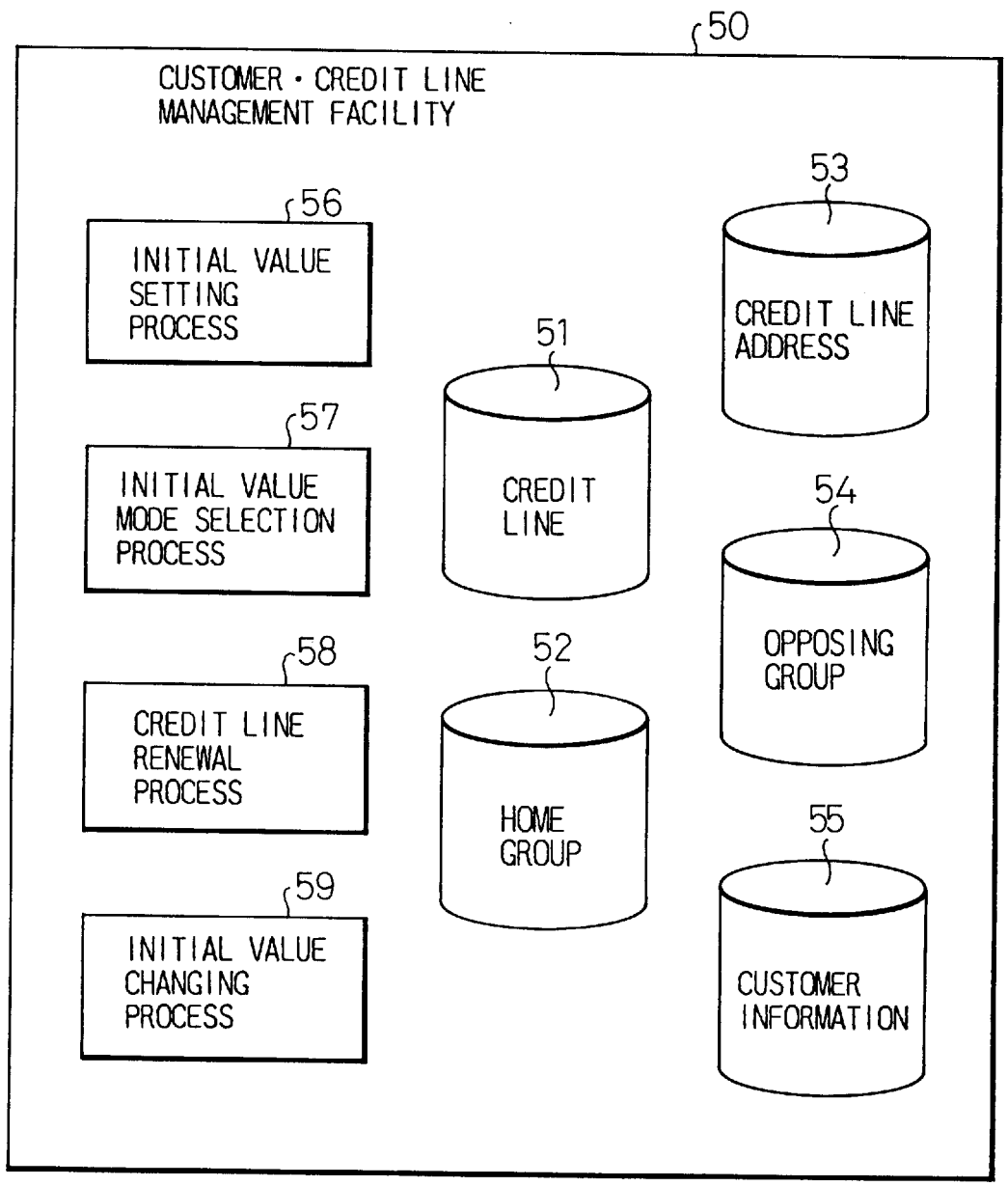
FIG. 7 is a constitutional view showing a customer credit line management facility.

FIG. 7 illustrates an embodiment of the construction of a customer credit line management facility 50 for realizing the present invention. In the FIG. 51 is a credit line file, 52 is a home group file, 53 is a credit line address file, 54 is an opposing group file, 55 is a customer information file, 56 is an initial value setting process, 57 is an initial value mode selection process, 58 is a credit line renewal process, and 59 is an initial value changing process.

The credit line file 51 manages the records of the data structures shown in FIG. 8. That is, it manages the initial values/present values of the credit lines and the cumulative values of the amount of the unsettled transactions for each settlement date (value date) arriving in the future, using the loading addresses as the retrieval keys.

The home group file 52 manages the customer nos. in the groups designated by the home group nos., using the home group nos. as the retrieval keys.

The credit line address file 53 uses the home group nos. as the retrieval keys and manages the ID of the opposing group held by the home group, designated by the home group no. and the record address of the credit line, file 51 to which the credit line set with the opposing group, is delivered.

The opposing group file 54 uses the home group nos. as retrieval keys and manages the customer nos. in the opposing group, held by the home group, designated by the home group no.

The customer information file 55 uses the customer nos. as retrieval keys, manages the record address of the credit line file 51 to which the credit line, held by the customer designated by the customer no., is delivered corresponding to the customer for whom the credit line is set, and manages various kinds of customer information.

Figure 9A:
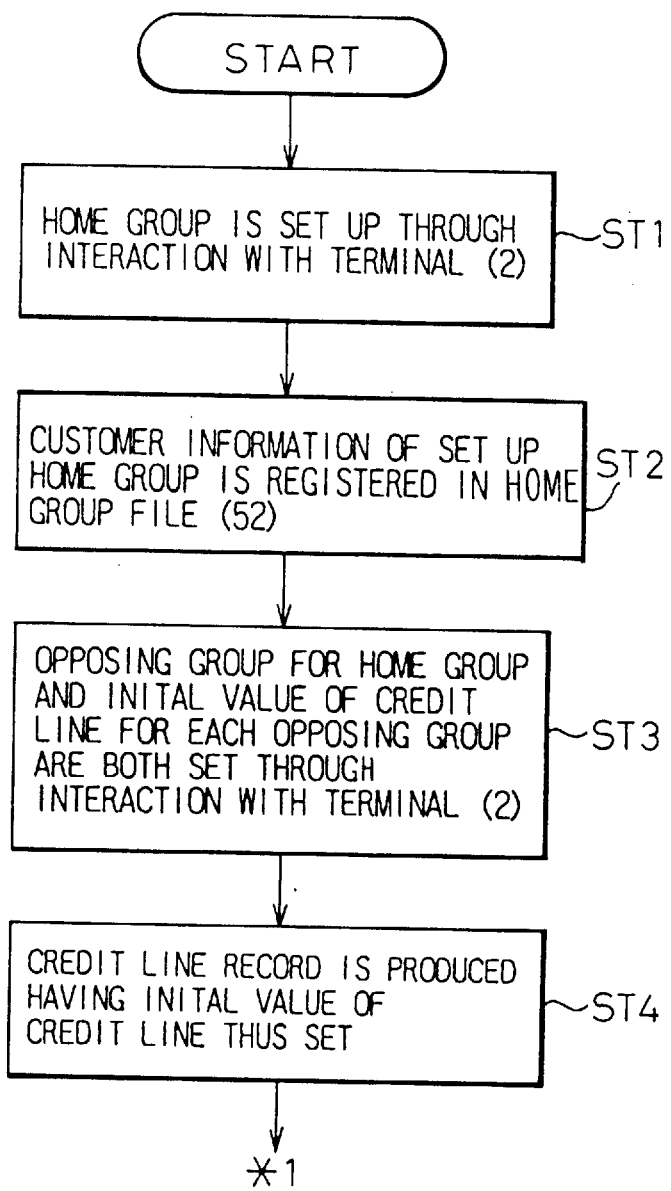
Figure 11A:
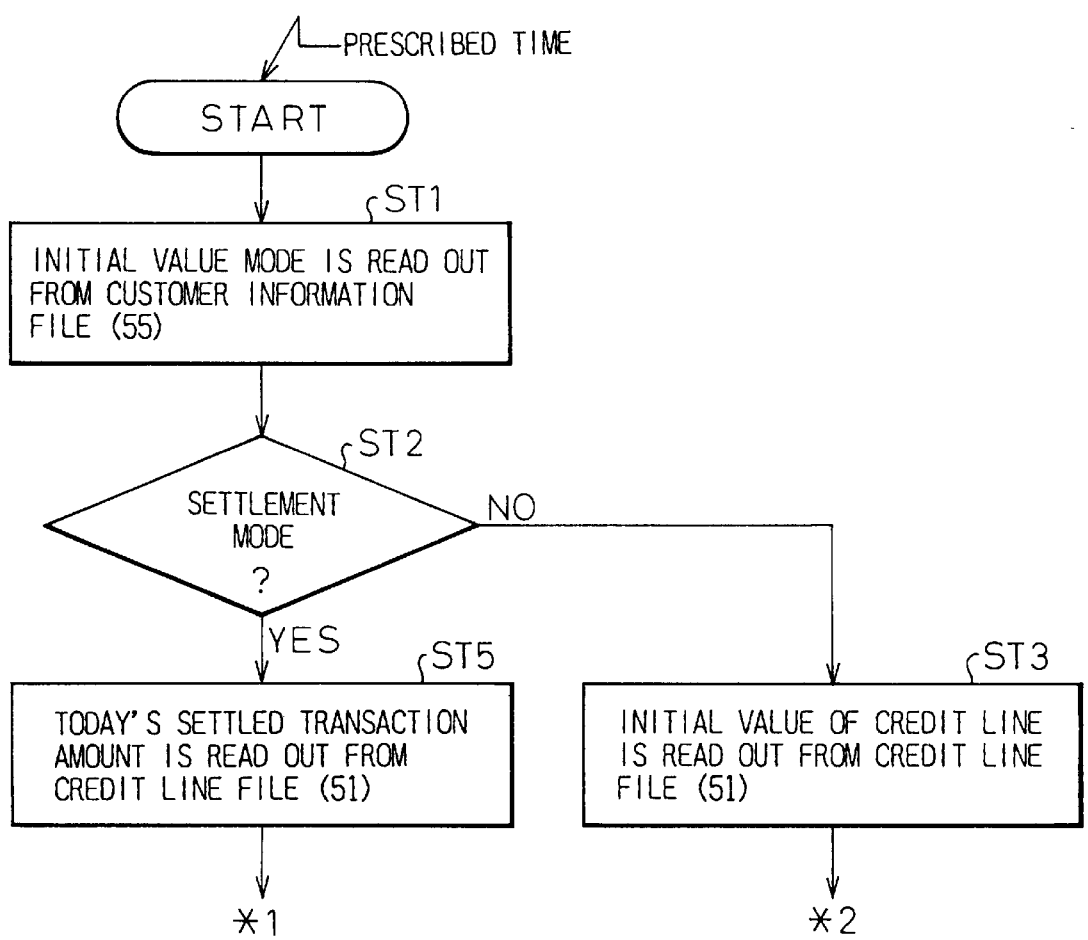
FIGS. 11A and 11B show an embodiment of the flow of the processing executed by a credit line renewal process.
Figure 11B:
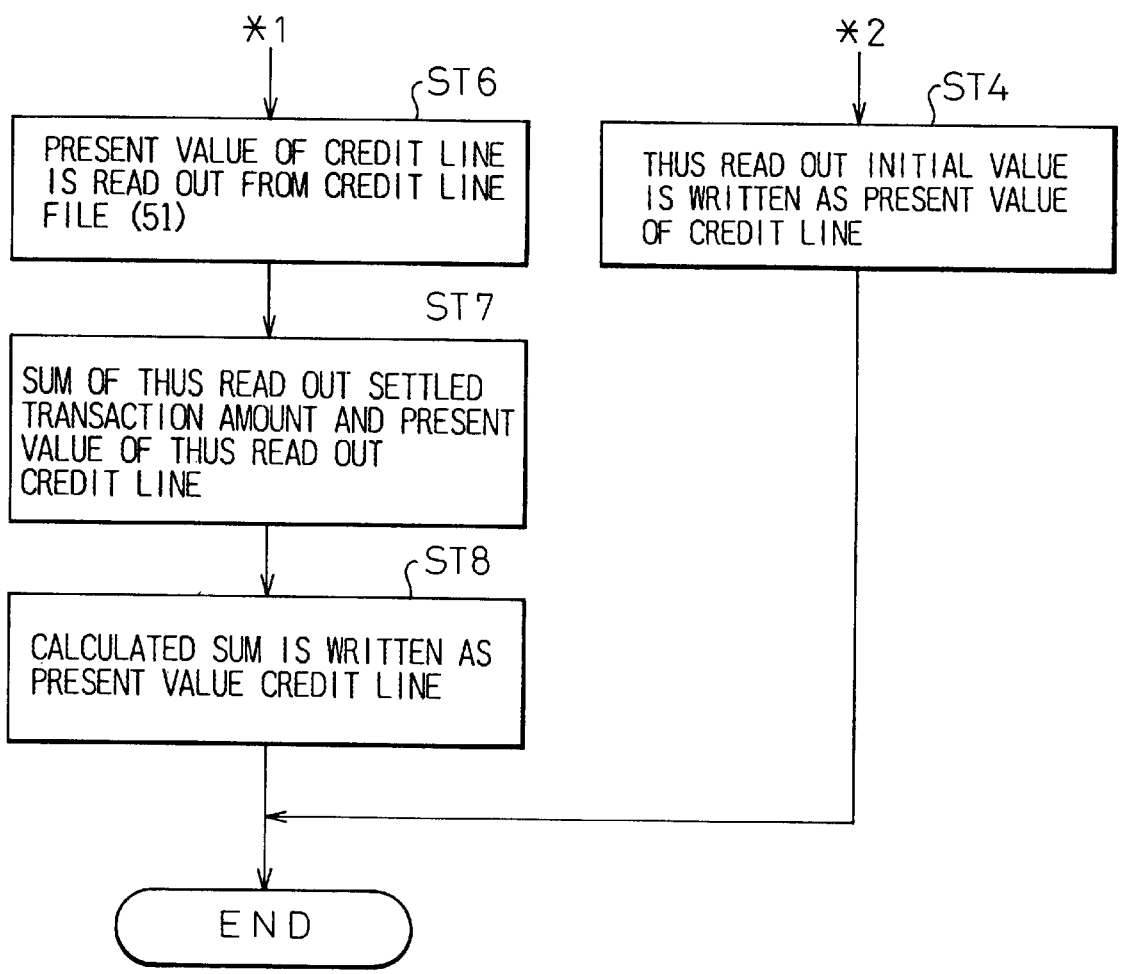
Figure 12A:
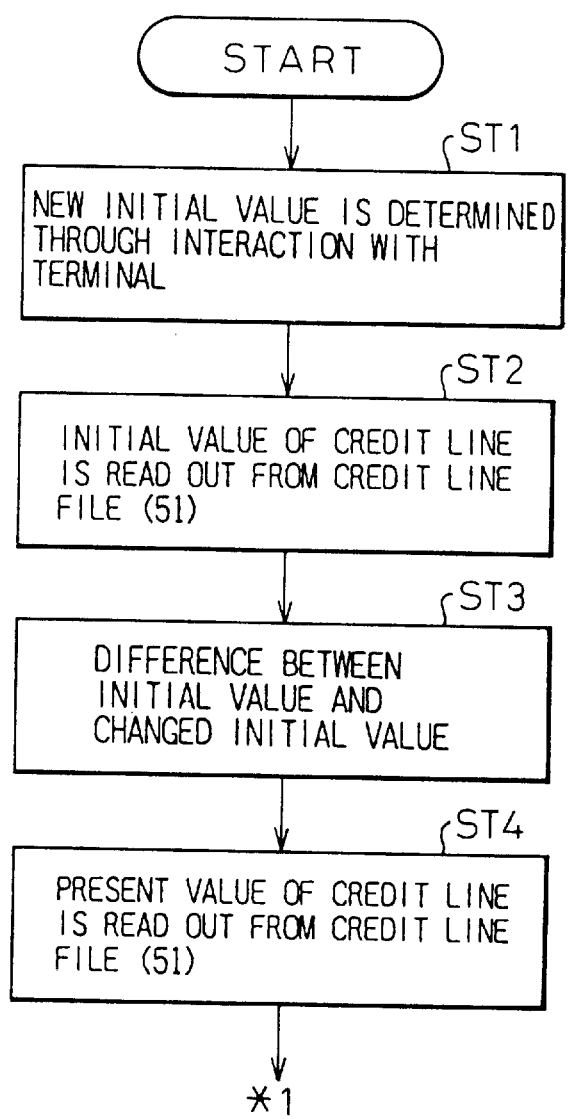
FIGS. 12A and 12B show an embodiment of the flow of processing executed by an initial value changing process.

FIGS. 9A and 9B show an embodiment of the flow of the processing executed by the initial value setting process 56, while FIG. 13, FIGS. 14A to 14C, and FIG. 15 show an example of the processing of the initial value setting process. FIG. 10 shows an embodiment of the flow of the processing executed by the initial value mode selection process 57, FIGS. 11A and 11B show an embodiment of the flow of the processing executed by a credit line renewal process 58, and FIGS. 12A and 112B show an embodiment of the flow of the processing executed by an initial value changing process 59.

Figure 14A:
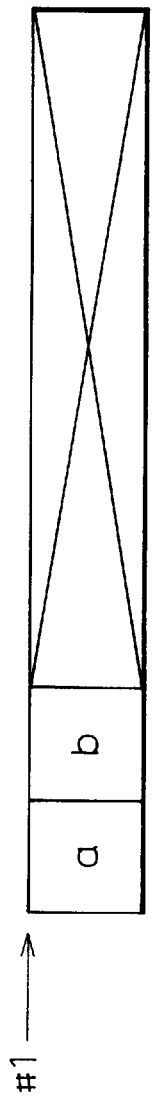
FIGS. 14A, 14B, and 14C show an example of the initial value setting process.

Next, a detailed explanation will be made of the processing of the present invention in accordance with these flows of processing. First, an explanation will be made of the processing for executing the initial value setting process 56. The initial value setting process 56 (see FIG. 9A) sets one or more home groups, comprised of pluralities of customers, through interaction with a terminal 2 at step 1 (ST1), as shown by the flow of processing of FIGS. 9A and 9B when there is a request for grouping of customers from another customer. For example, as shown in FIG. 13, it sets a home group #1 comprised of the customer a and the customer b as shown in FIG. 13. Next, at step 2 (ST2), customer information of the home groups, set at step 1 (ST1) is registered in the home group file 52. For example, as shown in FIG. 14A, the customer nos. of the customer a/customer b are registered in the record of the home group file 52 managing the customer information of the home group #1.

Next, at step 3 (ST3), one or more opposing groups, for a home group, and initial values of credit lines for the individual opposing groups are set through interaction with the terminal 2. For example, as shown in FIG. 13, two opposing groups (A, B) of an opposing group A comprised of the customer c and the customer d and an opposing group B comprised of the customer e, the customer f, and the customer g are set as the opposing groups for the home group #1. α is set as the initial value of the credit line held by the home group #1 for the opposing group A and β is set as the initial value of the credit line held by the home group #1 for the opposing group B.

Figure 14B:
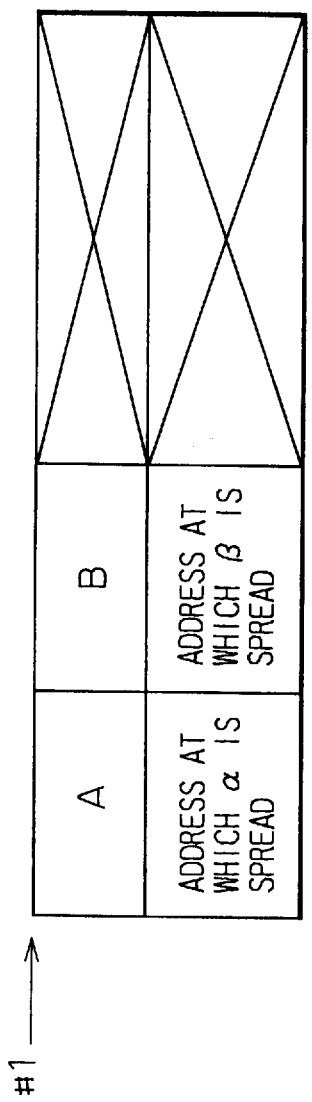

Next, at step 4 (ST4), a credit line record of the credit line file 51, holding the initial values of the credit lines set at step 3 (ST3) is produced. For example, as shown in FIG. 15, a credit line record having α as the initial value of the credit line and a credit line record having β as the initial value of the credit line are produced. Next, at step 5 (ST5) of FIG. 9B, the spread address of the credit line record produced at step 4 is registered along with the opposing group ID in the credit line address file 53. For example, as shown in FIG. 14B, the spread address of the initial value α of the credit line is registered along with the ID of the opposing group A and the spread address of the initial value β of the credit line is registered along with the ID of the opposing group B.

Figure 14C:
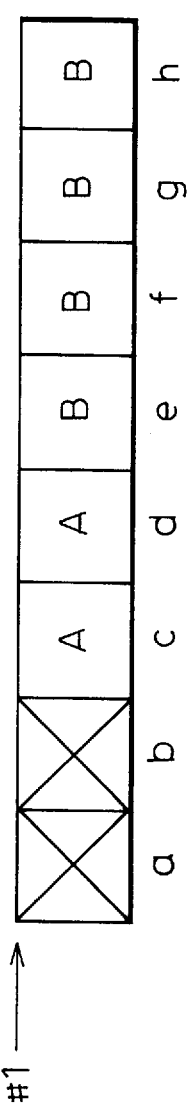

Next, at step 6 (ST6), the customer information of the opposing group set in step 3 is registered in the opposing group file 54. For example, as shown in FIG. 14C, the facts that the customer c/customer d belong to the opposing group A and the customer e/customer f/customer g/customer h belong to the opposing group B are registered.

Finally, at step 7 (ST7), the spread address of the credit line record produced at step 4 is registered in the customer information file 55. In terms of the explanation in the examples up to now, as shown in FIG. 15, the spread address of the initial value α of the credit line is registered at the entry positions which the customer a manages with respect to the customer c/customer d and the spread address of the initial value β of the credit line is registered at the entry positions which the customer a manages with respect to the customer e/customer f/customer g/customer h. In the same way, the spread address of the initial value α of the credit line is registered at the entry positions which the customer b manages with respect to the customer c/customer d, while the spread address of the initial value β of the credit line is registered at the entry positions which the customer b manages with respect to the customer e/customer f/customer g/customer h.

In this way, the credit line file 51 for managing the credit line, set between the home group and opposing group, is produced and the grouping information etc. are registered in the home group file 52, the credit line address file 53, the opposing group file 54, and the customer information file 55. The rate market management facility 401 (FIG. 6) of the host system 40 refers to the customer information file 55 so as to access the credit line file 51 and obtain the credit line required. The other home group file 52, credit line address file 53, and opposing group file 54 are used for the interaction processing with the user.

In this way, the initial value setting process 56 (FIG. 7) executes the flow of processing of FIGS. 9A and 9B to make it possible for a plurality of customers in a home group to hold the same credit line with respect to another customer. Due to this, for example, it is possible for a plurality of customers such as the branch a, the branch b and the branch c under a bank A to have a common credit line with another single customer bank B.

Further, the single customer setting the line can be given the same credit line for a plurality of customers, for whom the credit line is set, belonging to a certain single opposing group. By this arrangement, for example, it becomes possible for a certain single customer such as the bank A to have a common credit line with a plurality of customers such as a branch a, a branch b and a branch c under a bank B.

Further, it becomes possible for a plurality of customers in individual home groups to hold the same credit line for customers in certain opposing groups. Due to this, it becomes possible for first plurality of customers, such as the branch a, the branch b and the branch c under a bank A, to have a common credit line with a second plurality of customers, such as a branch c and a branch d under a bank B.

The credit line is reduced with the establishment of a transaction and is renewed to a set initial value each time a prescribed time arrives. Preferably, the value of the credit line is maintained, as is, even when new members are added to the home group or members are eliminated. Preferably, it is maintained, as is, even when new members (customers) are added to the opposing group or members are eliminated. At this time, the concept is introduced of parent customers and subordinate customers in the home group. It is also possible to have the credit line maintained conditional, i.e., on there being no change in the parent customer.

Next, an explanation will be given of the processing executed by the initial value mode selection process 57 (FIG. 7) and the credit line renewal process 58 (FIG. 7).

The initial value mode selection process 57 selects an initial value mode in accordance with the attributes of the customer at step 1, as shown in the flow of processing of FIG. 10. There are two initial value modes such as a first mode for renewing the present value of the credit line to a pre-prepared initial value and a second mode for renewing the present value of the credit line to a value specified from the amount of any transactions settled on that day. Next, at step 2 (ST2), the selected initial value mode is registered in the customer information file 55 and the processing is ended.

On the other hand, when the time for renewal of the present value of the credit line arrives, as shown in the flow of processing of FIGS. 11A and 11B, the credit line renewal process 58 reads out the initial value mode from the customer information file 55 at step 1 (ST1). That is, it selects the initial value mode selection processing 57 and reads out the renewal mode of the initial value. Next, at step 2 (ST2), it is judged if the initial value mode read out is the settlement mode instructing the use of the amount of the transaction to be settled. When it is judged that the mode is not the settlement mode, the process proceeds to step 3 (ST3), where the initial value of the credit line is read out from the credit line file 51. At the following step 4 (ST4), the credit line is renewed by rewriting the present value of the credit line of the credit line file 51 with the initial value of the credit line read out.

On the other hand, when it is judged at step 2 of FIG. 11A that the initial value mode read out at step 1 is the settlement mode, the process proceeds to step 5 (ST5) where the amount of the transactions to be settled that day is read out from the credit line file 51. At the following step 6 (ST6), the present value of the credit line is read out from the credit line file 51. Next, at step 7 (ST7), the sum of the amount of transactions read out at step 5 and the present value of the credit line read out at step 6 is calculated, then at the following step 8 (ST8), the present value of the credit line of the credit line file 51 is rewritten to the read out sum so as to renew the credit line. Note that the above processing is executed with respect to all the credit lines.

In this way, the credit line renewal process 58 (FIG. 7) executes the flow of processing of FIGS. 11A and 11B so as to use the sum of the credit line set by the amount of transactions to be settled that day and the present value of the credit line as the initial value, so it is possible to prevent the increase of the amount of transactions unsettled.

Next, an explanation will be made of the processing executed by the initial value changing process 59 (FIG. 7).

Figure 12B:
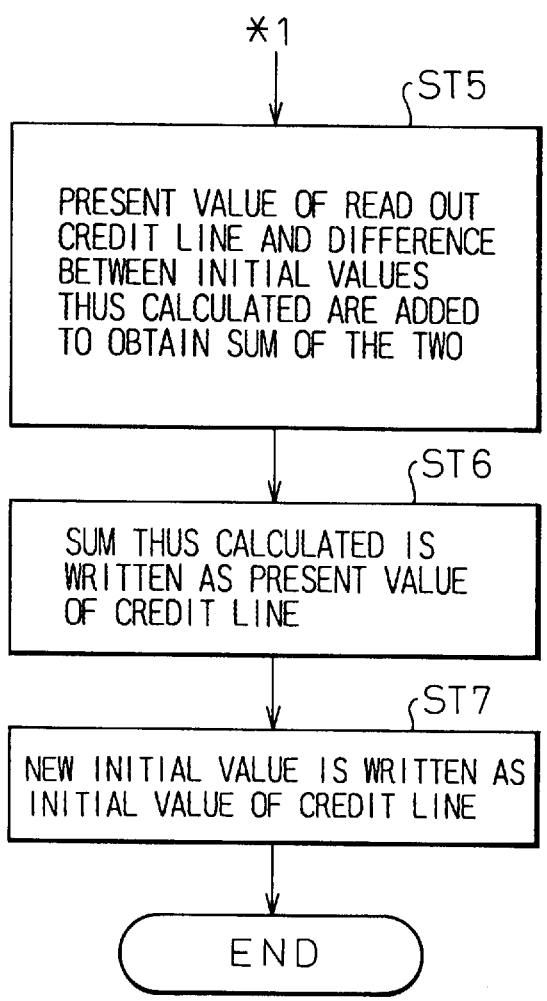

When there is a request for a change of the initial value of a credit line from a user, as shown by the flow of processing of FIGS. 12A and 12B, the new initial value is determined through interaction with the terminal 2 at step 1 (ST1). Next, at step 2 (ST2), the initial value of the set credit line is read out from the credit line file 51 (FIG. 7). After this, at step 3 (ST3), the difference between the initial value of the new credit line determined at step 1 and the initial value of the credit line read out at step 2 is calculated so as to calculate the difference before and after the change of the initial value.

Next, at step 4 (ST4), the present value of the credit line is read out from the credit line file 51. Then, at step 5 (ST5), the sum of the present value of the read out credit line and the difference in the initial value before and after the change calculated at step 3 is calculated, then at step 6 (ST6) the present value of the credit line of the credit line file 51 is rewritten to the read out sum so as to change the present value of the credit line. Finally, at step 7 (ST7), the initial value determined at step 1 is set as the initial value of the new credit line of the credit line file 51. Note that the processing for changing the initial value can be performed by designating a specific credit line for a certain home group and can be performed by designating all the credit lines.

In this way, when the initial value changing process 59 executes the flow of processing of FIGS. 12A and 12B to change the initial value of a credit line, it simultaneously changes the present value of the credit line as well by the difference between the amount before and after that change, so it becomes possible to set a credit line, demanded by the market, immediately from the point of time of the change rather than from the prescribed time for setting initial values of credit lines.

As explained above, according to the present invention, it becomes possible to realize an electronic dealing system wherein credit lines can be set in accordance with the nature of the customers and the values of the credit lines can be changed in accordance with the state of transactions on the electronic market, thereby enabling transactions meeting market needs.

We claim:

1. An electronic dealing system for processing transactions between customers, comprising:

management means for managing present values of credit lines set between one customer and another customer including reducing each credit line each time a transaction by the respective customer is established, starting from initial values of the credit lines and for electronically performing matching processing between information on transaction orders placed by order side customers and information on transaction orders placed by hit side customers, under limiting conditions designated by the credit lines managed by the management means for the order and hit side customers, respectively, so as to thereby establish transactions therebetween; and setting means for grouping a plurality of customers in a home group and for setting a common credit line, as an initial value of a credit line, between the home group and another single customer not belonging to the home group, as the credit line held by the home group.

2. An electronic dealing system as set forth in claim 1, wherein the management means further comprises:

means for managing the initial values and the present values of the credit lines for all customers for whom credit lines have been set, using respective customer identifiers as retrieval keys; and registration means for registering the common credit lines, set by the setting means, at entry positions of the management means designated by the customer identifiers in the same home group set by the setting means as the initial values of the credit lines.

3. An electronic dealing system as set forth in claim 2, wherein the management means further comprises means for maintaining, as is, a credit line set between the home group and a single customer even if there is a change in some of the members of the home group as set by the setting means.

4. An electronic dealing system for processing transactions between customers comprising:

management means for managing present values of credit lines set between one customer and another customer including reducing each credit line each time a transaction by the respective customer is established, starting from initial values of the credit lines and for electronically performing matching processing between information on transaction orders placed by order side customers and information on transaction orders placed by hit side customers, under limiting conditions designated by the credit lines managed by the management means for the order and hit side customers, respectively, so as to thereby establish transactions therebetween; and setting means for setting a single customer as a customer setting the line and grouping a plurality of other customers, not belonging to said customer setting the line, in an opposing group and for setting a common credit line, as an initial value of a credit line set between the opposing group and said single customer, as the credit line held by the customer setting the line.

5. An electronic dealing system as set forth in claim 4, wherein the management means further comprises means for managing the initial values and the present values of the credit lines for all customers for whom credit lines have been set, using respective customer identifiers as retrieval keys; and registration means for registering the common credit lines, set by the setting means, at entry positions of the management means designated by the customer identifier of the customer setting the line, which is set by the setting means as the initial values of the credit lines, so as to be common for the customers for whom credit lines have been set and who belong to the opposing group.

6. An electronic dealing system as set forth in claim 5, wherein the management means further comprises means for maintaining as is, a credit line set between the customer setting the line and an opposing group even if there is a change in some of the members of the opposing group as set by the setting means.

7. An electronic dealing system for processing transactions between customers, comprising:

management means for managing present values of the credit lines set between one customer and another customer including reducing each credit line each time a transaction is established, starting from initial values of the credit lines and for electronically performing matching processing between information on transaction orders placed by order side customers and information on transaction orders placed by hit side customers, under limiting conditions designated by the credit lines managed by the management means for the order and hit side customers, respectively so as to thereby establish transactions therebetween; and setting means for grouping a first plurality of first customers in a home group, for grouping a second plurality of second customers, not belonging to the home group, in an opposing group, and for setting a common credit line as an initial value of a credit line, set between the second customers belong to the opposing group and the first customers belonging to the home group as the credit line held by the home group.

8. An electronic dealing system as set forth in claim 7, wherein the management means further comprises means for managing the initial values and the present values of credit lines for all customers for whom credit lines have been set, using respective customer identifiers as retrieval keys; and registration means for registering the common credit lines, set by the setting means, at entry positions of the management means designated by the customer identifiers in the same home group set by the setting means as the initial values of the credit lines, so as to be common for the customers for whom the credit lines have been set and who belong to the opposing group.

9. An electronic dealing system as set forth in claim 8, wherein the management means further comprises means for maintaining, as is, a credit line set between the home group and the opposing group even if there is a change in some of the members of the home group or the members of the opposing group as set by the setting means.

10. An electronic dealing system for processing transactions between customers, comprising:

management means for managing present values of the credit lines set between one customer and another customer including reducing each credit line each time a transaction by the respective customer is established, starting from initial values of the credit lines and for electronically performing matching processing between information on transaction orders placed by order side customers and information on transaction orders placed by hit side customers, under limiting conditions designated by the credit lines managed by the management means for the order and hit side customers, respectively, so as to thereby establish transactions therebetween;

setting means for setting initial values of the credit lines in the management means each time a prescribed time arrives;

first changing means for changing the initial values of the credit lines; and second changing means for changing the present values of the credit lines, managed by the above-mentioned management means, in accordance with the difference between the initial values of the credit lines before and after the change when changing the initial values of the credit lines.

11. An electronic dealing system for processing transactions between customers, comprising:

management means for managing present values of the credit lines set between one customer and another customer including reducing each credit line each time a transaction by the respective customer is established, starting from initial values of the credit lines and for performing matching processing between information on transaction orders placed by order side customers and information on transaction orders placed by hit side customers, under limiting conditions designated by the credit lines managed by the management means for the order and hit side customers, respectively, so as to thereby establish transactions therebetween;

setting means for setting initial values of the credit lines in the management means each time a prescribed time arrives;

specifying means for specifying the amount of transactions to be settled on a date and thereby for setting the initial values of the credit lines; and initial value mode selection means for selecting whether to follow a first designation mode or to follow a second designation modes, as the designation mode of the initial value of the credit line; and said setting means performing processing so as to set, as the initial value of a credit line, a pre-prepared initial value when the initial value mode selection means selects to follow the first designation mode and so as to set in place of the initial value the sum of the credit line determined by the amount of transactions to be settled specified by the specifying means and the present value of the credit line managed by the management means.

* * * * *

UNITED STATES PATENT AND TRADEMARK OFFICE
CERTIFICATE OF CORRECTION

PATENT NO. : 5,832,462
DATED : November 3, 1998
INVENTOR(S) : Hideyo MIDORIKAWA et al.

It is certified that error appears in the above-identified patent and that said Letters Patent is hereby corrected as shown below:

Col. 1, between lines 28 and 29, insert:

--Before describing the embodiments of the present invention, the related art and the problems therein will be first described with reference to the related figures.

In an electronic dealing system to which the present invention is applied, as shown in Fig. 1, when an order side customer places a transaction order through an order side dealing terminal 100, the market information (rate information) is notified to hit side customers through the hit side dealing terminal 110. When in response to the notification, there is a request for a hit of the transaction order from a hit side customer, a first electronic matching processing is executed by processor 120 so as to compare the terms of the transaction of the placed order and the terms of the transaction of the hit request.

When it is judged by this comparison that the terms of the transaction (price of transaction and amount of transaction) match (120-1), the correspondent agreements are compared (120-2). That is, it is checked to determine if each other party concluding the agreement is able to do business. If it is judged by this comparison that each other party is able to do business, the credit lines are then compared (120-3). That is, it is checked to determine if the amount of the transaction is inside (i.e., within) the credit lines.

If it is judged as a result of this comparison that the amount is inside the credit lines, the transaction is established, and so confirmation sheets 131, 141 of the transaction are output (130, 140) to the order side customer and the hit side customer and the information in the changed market rate is displayed on the log-in terminal 150.

UNITED STATES PATENT AND TRADEMARK OFFICE
CERTIFICATE OF CORRECTION

PATENT NO. : 5,832,462
DATED : November 3, 1998
INVENTOR(S) : Hideyo MIDORIKAWA et al.

It is certified that error appears in the above-identified patent and that said Letters Patent is hereby corrected as shown below:

In a conventional electronic dealing system performing this processing, the processing of the dealing system which was performed before the use of the electronic system has merely been replaced by computer processing. No positive, or realistic, means has been provided for realizing transactions meeting the needs of the market.

In this way, in a conventional electronic dealing system, no positive, or realistic, means has been provided for realizing transactions meeting the needs of the market. In other words, no means has been provided which enables credit lines to be set in accordance with the nature of the customers. Further, no means was provided which enables the values of the credit lines to be changed in accordance with the state of the transactions on the electronic market and the situation of the customers with whom business is being done.--

Col. 2, line 30, change "represents, block represents is" to --1 represents--;
line 37, change "in" (second occurrence) to --with--;
line 40, delete "means";
line 41, delete "means";
line 49, delete "means";
line 51, delete "means";
line 52, delete "means";
line 53, delete "means";
line 54, change "means" to --unit--.

UNITED STATES PATENT AND TRADEMARK OFFICE
CERTIFICATE OF CORRECTION

PATENT NO.  : 5,832,462
DATED       : November 3, 1998
INVENTOR(S) : Hideyo MIDORIKAWA et al.

It is certified that error appears in the above-identified patent and that said Letters Patent is hereby corrected as shown below:

Col. 4,    line 26, change "is" (second occurrence) to --,--;
           line 40, change "means" to --unit--;
           line 45, change "means" to --unit--;
           line 53, delete "so".

Col. 5,    line 56, change "application" to --applications of the invention--;
           line 61, delete "a".

Col. 6,    line 67, after "is" insert --,--.

Col. 7,    line 20, change "FIG." to --figure,--;
           line 39, delete ",";
           line 40, after "line" insert --,--;
           line 60, change "112B" to --12B--.

UNITED STATES PATENT AND TRADEMARK OFFICE
CERTIFICATE OF CORRECTION

PATENT NO. : 5,832,462
DATED : November 3, 1998
INVENTOR(S) : Hideyo MIDORIKAWA et al.

It is certified that error appears in the above-identified patent and that said Letters Patent is hereby corrected as shown below:

Col. 9,    line 23, after "for" insert --a--.

Col. 12,   line 3, after "maintaining" insert --,--.

Signed and Sealed this

Sixth Day of July, 1999

Attest:

Attesting Officer

Q. TODD DICKINSON

Acting Commissioner of Patents and Trademarks